United States Patent
Lee et al.

(10) Patent No.: US 8,340,296 B2
(45) Date of Patent: Dec. 25, 2012

(54) METHOD AND SYSTEM FOR REGISTERING AND VERIFYING SMART CARD CERTIFICATE FOR USERS MOVING BETWEEN PUBLIC KEY INFRASTRUCTURE DOMAINS

(75) Inventors: Byung-rae Lee, Yongin-si (KR); Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1387 days.

(21) Appl. No.: 10/759,271

(22) Filed: Jan. 20, 2004

(65) Prior Publication Data

US 2004/0144840 A1 Jul. 29, 2004

(30) Foreign Application Priority Data

Jan. 20, 2003 (KR) .................. 10-2003-0003723

(51) Int. Cl.
*H04L 29/06* (2006.01)
*H04L 9/00* (2006.01)
*H04L 9/08* (2006.01)

(52) U.S. Cl. ........ 380/277; 380/279; 380/283; 713/155; 713/156; 713/157; 713/170; 713/186; 713/193; 705/51; 705/64; 705/67; 238/380

(58) Field of Classification Search .................. 380/277, 380/235, 279, 283; 235/380; 713/155, 156, 713/157, 170, 173, 186, 193; 705/64, 67, 705/51; 238/380
See application file for complete search history.

(56) References Cited

U.S. PATENT DOCUMENTS

| | | | | |
|---|---|---|---|---|
| 5,701,343 A * | 12/1997 | Takashima et al. | ............. | 705/51 |
| 5,721,781 A * | 2/1998 | Deo et al. | .......................... | 705/67 |
| 6,192,131 B1 * | 2/2001 | Geer et al. | ..................... | 380/283 |
| 6,212,634 B1 * | 4/2001 | Geer et al. | ..................... | 713/156 |
| 6,253,322 B1 * | 6/2001 | Susaki et al. | .................. | 713/170 |
| 6,738,900 B1 * | 5/2004 | Hardjono et al. | ............. | 713/156 |
| 6,834,795 B1 * | 12/2004 | Rasmussen et al. | .......... | 235/380 |
| 7,028,186 B1 * | 4/2006 | Stenman et al. | .............. | 713/173 |
| 7,085,931 B1 * | 8/2006 | Smith et al. | ..................... | 713/182 |
| 7,103,575 B1 * | 9/2006 | Linehan | .......................... | 705/64 |
| 7,152,158 B2 * | 12/2006 | Watanabe et al. | ............. | 713/156 |
| 7,188,362 B2 * | 3/2007 | Brandys | ............................ | 726/9 |
| 7,275,155 B1 * | 9/2007 | Aull | .............................. | 713/157 |
| 7,461,250 B1 * | 12/2008 | Duane et al. | .................. | 713/157 |
| 7,478,236 B2 * | 1/2009 | Roh et al. | ....................... | 713/157 |
| 2002/0029347 A1 * | 3/2002 | Edelman | ....................... | 713/193 |
| 2002/0042877 A1 * | 4/2002 | Wheeler et al. | ............... | 713/155 |
| 2002/0176582 A1 * | 11/2002 | Aull | ................................ | 380/279 |
| 2003/0026428 A1 * | 2/2003 | Loisel | ............................ | 380/277 |
| 2003/0132285 A1 * | 7/2003 | Blancas et al. | ................. | 235/380 |

(Continued)

*Primary Examiner* — Edan Orgad
*Assistant Examiner* — Kari Schmidt
(74) *Attorney, Agent, or Firm* — Sughrue Mion, PLLC

(57) ABSTRACT

Disclosed herein is a method and system for registering and verifying a smart card certificate for users moving between public key infrastructure domains, which allows a user moving between domains to have a smart card certified in a terminal located in an external domain other than a home domain. According to the present invention, when a user wants his/her own smart card to be certified in a terminal of an external domain, a certification authority of the external domain can certify the smart card using a certificate stored in the smart card and signed electronically by a certification authority of a home domain. Additionally, a new certificate issued by the certification authority of the external domain is stored in the certified smart card, so that a certificate of the moving user can be verified regardless of domains and a new certificate of a moved domain can be easily obtained.

18 Claims, 4 Drawing Sheets

U.S. PATENT DOCUMENTS

2003/0140232 A1* 7/2003 De Lanauze .................. 713/186
2003/0154376 A1* 8/2003 Hwangbo ..................... 713/173
2003/0156721 A1* 8/2003 Widman ....................... 380/277
2003/0196089 A1* 10/2003 Alve et al. .................... 713/172

* cited by examiner

METHOD AND SYSTEM FOR REGISTERING AND VERIFYING SMART CARD CERTIFICATE FOR USERS MOVING BETWEEN PUBLIC KEY INFRASTRUCTURE DOMAINS

The present application claims benefit of Korean Patent Application No. 10-2003-0003723 filed Jan. 20, 2003 in the Korean Intellectual Property Office, the disclosure of which is incorporated herein by reference.

BACKGROUND OF THE INVENTION

1. Field of the Invention

The present invention relates generally to a public key infrastructure, and more particularly, to a method and a system for registering and verifying a smart card certificate for users moving between public key infrastructure domains, which allows a user moving between domains to have a smart card certified in a terminal located in an external domain other than a home domain.

2. Description of the Related Art

A Public Key Infrastructure (PKI) allows users of a basically insecure public network, such as the Internet, to securely exchange data or money in the state where information security is assured, using a public and a private cryptographic key pair provided from a reliable authority.

The PKI generally includes a certification authority that issues and verifies digital certificates, a registration authority that acts as a verifier for the certification authority before certificates including information of public keys or private keys and digital certifications are issued to requesters, one or more directories where the certificates with their public keys are held, and a certification management system that manages the certificates.

The operation principles of the public keys and private keys are as follows. In public key cryptography, public and private keys are simultaneously created using the same algorithm by a certification authority. The private key is given only to requesters, and the public key is disclosed in directories, which all users can access, as parts of digital certificates. The private key is not shared with another user or is not transmitted across the Internet. A user uses a private key to decrypt a text that has been encrypted using the user's public key by someone else who can find out the user's public key from a public directory. Therefore, if a transmitter sends a certain message, the user can find out the public key of a receiver through a central administrator, and then sends the message encrypted using the public key. The receiver receiving the message decrypts the message using the user's private key. In addition to encrypting the message, the transmitter can authenticate the user by using the user's private key to encrypt a digital certificate.

Additionally, a smart card is made of plastics, to have a credit card size, and is equipped therein with a microchip for storing data. The smart card is used for various purposes, such as prepaid telephone calling and electronic payment, and can be reused by periodical charge.

In more detail, such a smart card is used to make a call using a mobile phone and pay a corresponding call charge, to confirm the user's identity at the time of accessing an Internet bank, to pay a parking fee or a fare of subway, train or bus, to directly provide personal information to a hospital or doctor without filling in a blank document, and to purchase a commodity in an online shop.

Such a smart card can contain much information compared to a magnetic stripe card, and be programmed to be used for various purposes. There are used smart cards that include data and programs to be used for various purposes besides general smart cards, and smart cards that can be upgraded for new uses after issuance. A smart card can be designed so that it is inserted into a slot to be read by a special reader, or designed to be read in a non-contact manner so that it is read from a distance, such as for a toll-road payment.

Meanwhile, as international electronic commerce is actively carried out and international travels, such as official tours, are common, a need for electronic certification for electronic commerce between countries has increased. Under such conditions, according to EMV2000 specifications decided by a group created by Europay, MasterCard and Visa, certification can be successfully performed only in cases where a terminal has a public key that can verify an electronic signature included in a certificate of the smart card at the time of certification between the smart card and the terminal. However, in the PKI domain structure, an individual certification authority is located in each of domains, and therefore public keys, which can verify electronic signatures of certification authorities, are different. For example, in Korea, public certification authorities issue public certificates usable only in Korea to users. As described above, in the PKI domain structure, terminals of one domain have a public key that can verify certificates issued by a certification authority of the domain in which the terminals are located, and do not have a public key of a certification authority of a different domain, and therefore certification of another domain cannot be performed.

That is, a user's smart card located in an external domain has a certificate signed electronically by a certification authority located in a home domain to which the smart card belongs, and a terminal should verify the certificate to certify the smart card. However, when the user wants the user's smart card to be certified in the external domain, the terminal does not have a public key of the certification authority that has issued the certificate to the smart card, so the certificate cannot be verified, and therefore, the smart card cannot be certified.

SUMMARY

Accordingly, the present invention has been made keeping in mind the above problems occurring in the related art, and an object of the present invention is to provide a method and system for registering and verifying a smart card certificate for users moving between PKI domains, which allows a certification authority of an external domain to certify a smart card in an external terminal using a certificate stored in the smart card and signed electronically by a certification authority of a home domain when a user wants the smart card to be certified in the external terminal of the external domain.

Another object of the present invention is to enhance the security of electronic commerce in the PKI environment by allowing the user to verify a terminal belonging to the external domain through the smart card.

In order to accomplish the above object, the present invention provides a system for registering and verifying a smart card certificate for users moving between public key infrastructure domains, including a smart card for storing a first certificate of a first domain, and a second terminal located in a second domain to transmit a certification response using the first certificate of the smart card and to transmit a second certificate of a second domain to the smart card with respect to the transmitted certification response. The transmitted second certificate is stored in the smart card, and a private key and a public key for the stored certificate are also stored in the smart card.

According to another embodiment of the present invention, the system may further include a second certification authority located in the second domain to verify the certification response transmitted through the second terminal, to create the second certificate to be stored in the smart card and to transmit the created second certificate to the second terminal, or a first certification authority located in the first domain and connected to the second certification authority through a network to verify the certification response transmitted from the second certification authority through the network and to transmit a verification result to the second certification authority. In this case, the verification of the certification response from the second certification authority is performed depending upon the verification result of the first certification authority.

In addition, the present invention provides a system for registering and verifying a smart card certificate for users moving between public key infrastructure domains, including a smart card for storing a first certificate of a first domain; and a first terminal located in the first domain to transmit a certification response using the first certificate stored in the smart card and to transmit a second certificate of a second domain to the smart card with respect to the transmitted certification response.

According to another embodiment of the present invention, the system may further include a first certification authority located in the first domain to verify the certification response transmitted through the first terminal and to transmit the second certificate to be stored in the smart card to the first terminal, or a second certification authority located in the second domain and connected to the second certification authority through a network to create the second certificate and to transmit the second certificate to the first certification authority in response to a certification request of the first certification authority.

In addition, the present invention provides a method for registering and verifying a smart card certificate for users moving between public key infrastructure domains, including the steps of a user accessing a second terminal located in a second domain using a smart card in which a first certificate of a first certification authority in the first domain is stored, the smart card transmitting a certification response to a certification request of the second terminal to the second terminal; the second terminal transmitting the certification response of the smart card to a second certification authority located in the second domain, and the second terminal transmitting a second certificate of the second certification authority transmitted from the second certification authority to the smart card in response to the transmitted certification response. At this time, the transmitted second certificate is stored in the smart card, and a private key and a public key for the stored certificate are also stored in the smart card.

The method according to the present invention further comprises the steps of the second certification authority transmitting its own public key to the second terminal, and the second terminal transmitting the public key of the second certification authority to the smart card. Preferably, the method further comprises the step of the smart card verifying the second terminal using the public key of the second certification authority.

The step of the smart card transmitting the certification response comprises the steps of the second terminal transmitting a certification request message to the smart card, and the smart card electronically signing the certification request message, and transmitting the certification response including the signed certification request message and the first certificate to the second terminal. The step of the second terminal transmitting the second certificate of the second certification authority comprises the steps of the second certification authority verifying the transmitted certification response, the second certification authority creating the second certificate to be stored in the certified smart card, and transmitting the created second certificate to the second terminal, and the second terminal transmitting the transmitted second certificate to the smart card. The step of the second certification authority verifying the transmitted certification response comprises the steps of the second certification authority transmitting the certification response transmitted from the smart card to the first certification authority located in the first domain and connected to the second certification authority through a network, and the first certification authority verifying the certification response and transmitting a verification result to the second certification authority.

In addition, the present invention provides a method for registering and verifying a smart card certificate for users moving between public key infrastructure domains, including the steps of a user accessing a first terminal located in a first domain using a smart card in which a first certificate of the first domain is stored, the smart card transmitting a certification response to a certification request of the first terminal to the first terminal, the first terminal transmitting the certification response of the smart card to the first certification authority located in the first domain, and the first terminal transmitting a second certificate of a second certification authority transmitted from the first certification authority to the smart card in response to the transmitted certification response. The transmitted second certificate is stored in the smart card, a private key for the stored certificate is also stored in the smart card.

The step of the smart card transmitting the certification response comprises the steps of the first terminal transmitting a certification request message to the smart card, and the smart card electronically signing an electronic signature to the certification request message, and transmitting the certification response including the signed certification request message and the first certificate to the first terminal. The step of the first terminal transmitting the second certificate of the second domain comprises the steps of the first certification authority verifying the transmitted certification response, the first certification authority requesting a second certificate to be stored in the verified smart card from a second certification authority located in the second domain, the second certification authority creating the second certificate and transmitting the created second certificate to the first certification authority, the first certification authority transmitting the transmitted second certificate to the first terminal, and the first terminal transmitting the transmitted second certificate to the smart card.

In accordance with another embodiment of the present invention, the method may further include the steps of the smart card storing the transmitted second certificate; the smart card accessing the second terminal of the second domain, the second terminal transmitting a certification request message to the smart card, the smart card attaching an electronic signature to the certification request message and transmitting a certification response including the signed certification request message and the stored second certificate issued by the second certification authority to the second terminal, and the second terminal verifying the certification response using a public key of the second certification authority; or the steps of the second certification authority transmitting an own public key of the second certification authority to the first certification authority, the first certification authority transmitting the public key of the second certification authority, and the first terminal transmitting the public key of the second certification authority to the smart card, and further the step of the smart card verifying the second terminal using the transmitted public key of the second certification authority.

In this case, the first and second certification authorities may communicate with each other through a computer network, as needed.

According to the embodiments of the present invention, the smart card stores the certificate signed electronically by the first certification authority of the first domain, to which the smart card belongs, to receive the new certificate from the second certification authority.

In such cases, the first domain is contrasted with the second domain, and can be any domain where the certificate of the first certification authority, which becomes a basis for obtaining a certificate usable in the second domain, is issued.

Additionally, in accordance with another embodiment of the present invention, the first or second terminal may have a public key that can verify an electronic signature of a certification authority located in a domain in which the terminal is located. The terminal denotes a device that comes into contact with a smart card to read information of the smart card or record information in the smart card. A card reader can be an example of the terminal. Additionally, the terminal performs such functions in a non-contact manner.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
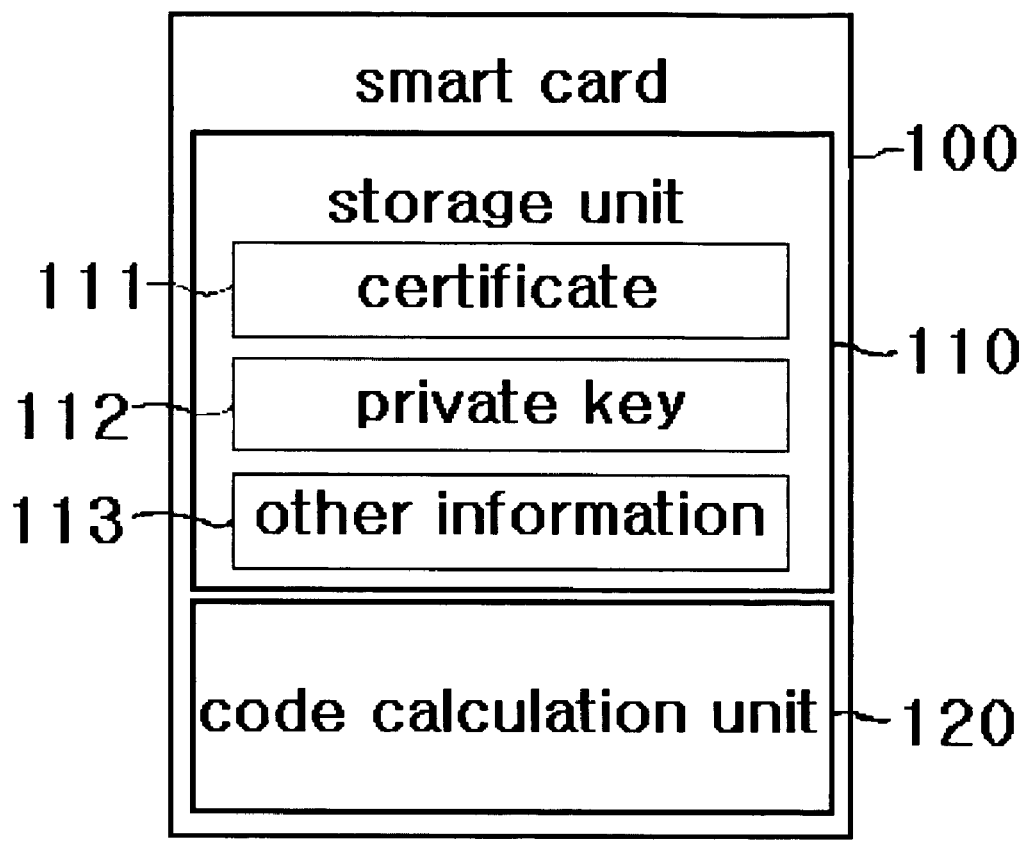
FIG. 1 shows a construction of a general smart card.

Reference now should be made to the drawings, in which the same reference numerals are used throughout the different drawings to designate the same or similar components.

Hereinafter, a method for registering and verifying a smart card certificate for users in PKI domains according to the present invention will be described with reference to the attached drawings.

FIG. 1 shows a construction of a general smart card, which can be applied to an embodiment of the present invention. The construction of the smart card 100 is generally divided into a storage unit 110 and a code calculation unit 120. The storage unit 110 includes a certificate 111 that is signed electronically by a certification authority, a private key 112 that is needed for an electronic signature and other information 113 that includes user information. The code calculation unit 120 performs a calculation for creating an electronic signature of a user and a calculation for verifying a certificate.

Figure 2:
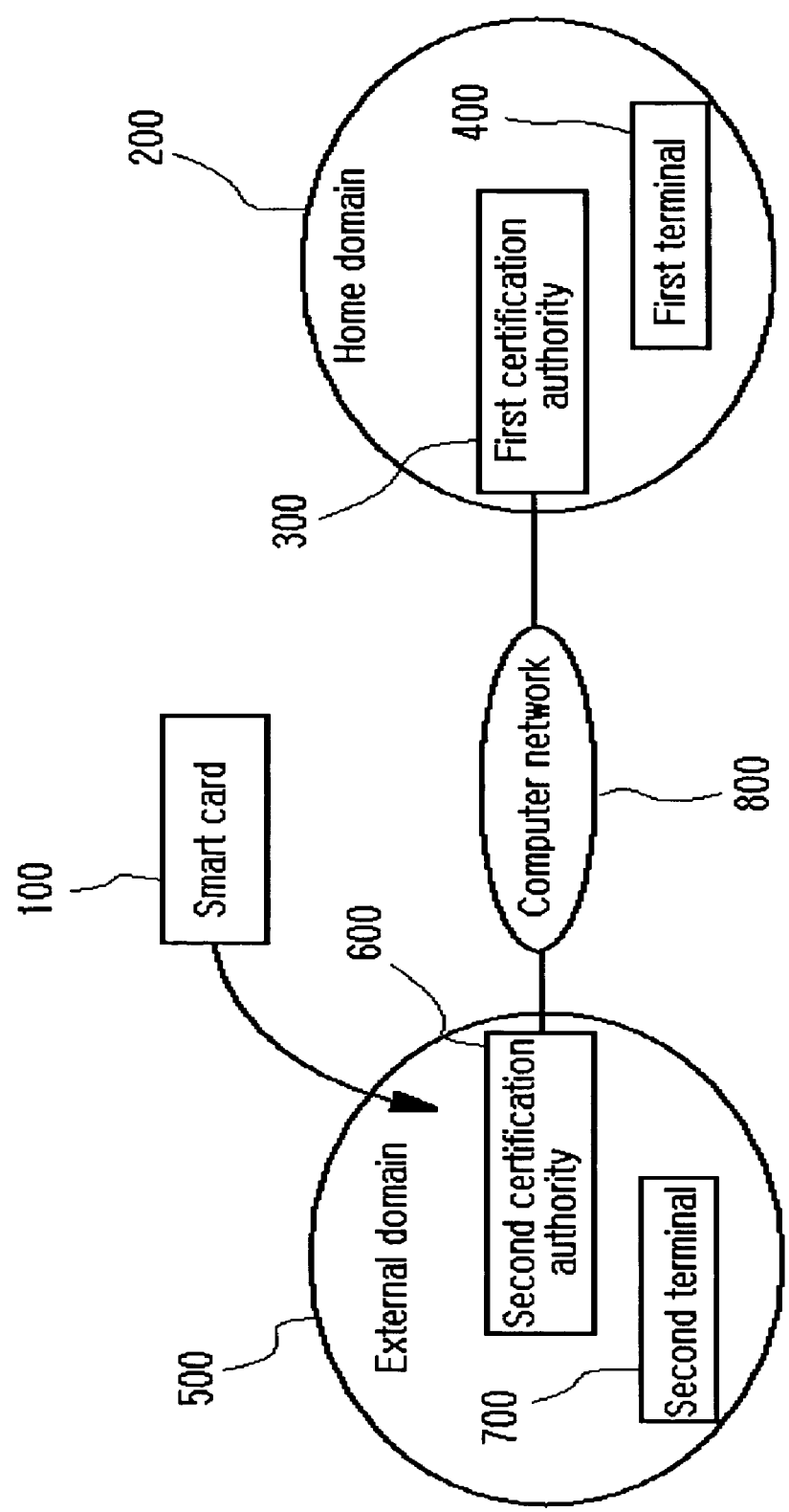
FIG. 2 shows a construction of an electronic certification system according to the movement between PKI domains according to the present invention.

FIG. 2 shows a construction of an electronic certification system according to the movement between the PKI domains according to the present invention. As shown in FIG. 2, the certification system includes the smart card 100 that stores a certificate and a public key, a first certification authority 300 that is located in a home domain 200 and issues the certificate 111 to a user, and a first terminal 400. Additionally, the certification system includes a second certification authority 600 of an external domain 500 that issues a new certificate to the smart card 100 of the user in the external domain 500, and a second terminal 700. In this case, the first and second certification authorities 300 and 600 are connected by a computer network 800 to communicate with each other in case of need, or a certificate signed electronically by a certification authority of another domain can be verified through a contract between certification authorities.

A method for registering and verifying a smart card certificate according to the movement between the PKI domains according to the present invention will be described.

Figure 3:
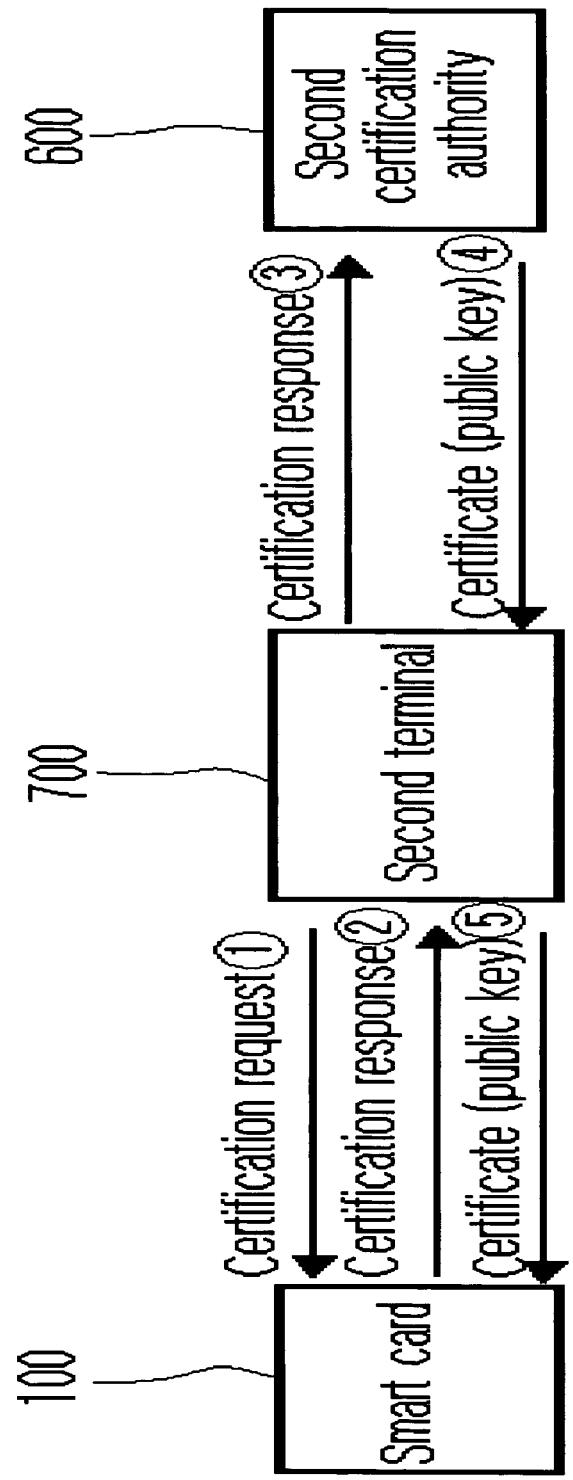
FIG. 3 is a diagram illustrating a method for registering and verifying a smart card certificate in an external domain according to a first embodiment of the present invention.

FIG. 3 is a chart illustrating a method for registering and verifying a smart card certificate for users moving between the PKI domains according to the first embodiment of the present invention.

The method for registering and verifying a smart card certificate for users moving between the PKI domains according to the first embodiment of the present invention is a method of receiving a certificate signed electronically by the second certification authority 600 in the external domain 500 through the second terminal 700.

If a user accesses the second terminal 700 of the external domain 500 using the smart card 100 of the user, the second terminal 700 transmits a certification request message to the smart card 100 of the user (1).

The smart card 100 of the user attaches an electronic signature to the certification request message and transmits a certification response including the signed certification request message and its own certificate issued by the first certification authority 300 to the second terminal 700 (2).

Thereafter, the second terminal 700 transmits the certification response to the second certification authority 600 of the external domain 500 (3).

The second certification authority 600 verifies the certification response through a contract with the certification authority of a home domain 200 or a computer communication, searches for cancellation lists of certificates and checks whether the certificate of the user has been cancelled. If the certificate of the user is valid, the second certification authority 600 creates a new certificate, to which the second certification authority 600 attaches an electronic signature, and transmits the new certificate to the second terminal 700 (4). If the certificate is not valid or cancelled, a new certificate is not registered.

The second terminal 700 transmits the new certificate of the user transmitted from the second certification authority 600 to the smart card 100 (5).

The user stores the new certificate, newly certified by the second certification authority 600, in the smart card 100.

By the above-described method, the new certificate is issued to the smart card 100.

Meanwhile, according to the embodiment of the present invention, a user carries out safe electronic commerce with an external domain by verifying whether the terminal of the external domain is a terminal that has been certified from a corresponding certification authority. Accordingly, in the certification processes, when the second certification authority 600 transmits the new certificate signed electronically by the second certification authority 600 to the second terminal 700, the public key of the second certification authority 600 is also transmitted. The public key transmitted from the second terminal 700 is transmitted to the smart card 100 when the new certificate is transmitted to the smart card 100. The smart card 100 can verify the certificate of the second terminal 700 or a certificate signed electronically by the second certification authority 600 using the public key.

Additionally, according to another embodiment of the present invention, a user requests that the first certification authority 300 of the home domain 200 to which the user belongs provides the user with a new certificate from the second certification authority 600 of an external domain to be visited.

Figure 4:
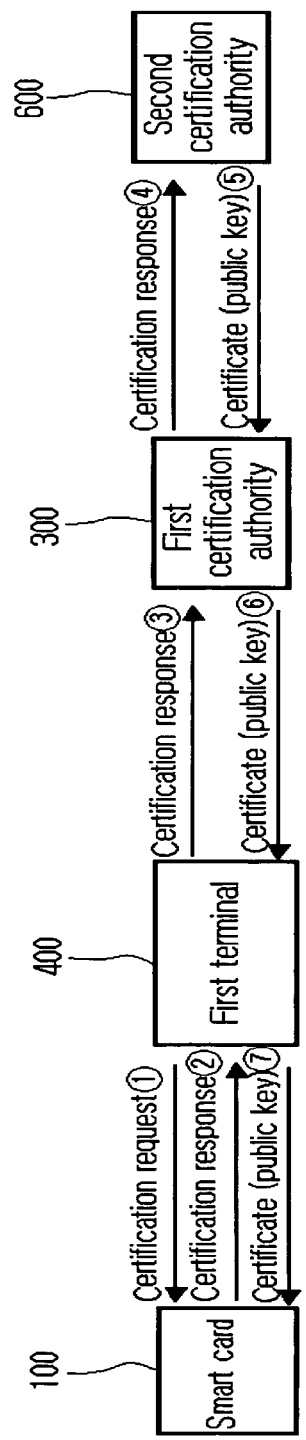
FIG. 4 is a diagram illustrating a method for registering and verifying a smart card certificate in the external domain according to a second embodiment of the present invention.

FIG. 4 is a chart illustrating a method for registering and verifying a smart card certificate for users moving between the PKI domains according to a second embodiment of the present invention.

If a user accesses the first terminal 400 of a home domain 200 using the smart card 100 of the user, the first terminal 400 transmits a certification request message to the smart card 100 of the user (1).

The smart card 100 of the user attaches an electronic signature to the certification request message and transmits a certification response including the signed certification request message and its own certificate issued by the first certification authority 300 to the first terminal 400 (2).

Thereafter, the first terminal 400 transmits the certification response transmitted from the user's smart card to the first certification authority 300 of the home domain 200 (3).

The first certification authority 300 searches for cancellation lists of the certificate and checks whether the certificate of the user is valid. If the certificate of the user is valid, the first certification authority 300 transmits the certificate of the user or corresponding information to the second certification authority 600 of the external domain 500, and requests the issuance of a new certificate of the second certification authority 600 (4). If the certificate of the user is not valid, a new certificate is not registered.

The second certification authority 600 creates the new certificate using the transmitted certificate or corresponding information, attaches an electronic signature to the new certificate and transmits the signed new certificate to the first certification authority 300 (5).

The first certification authority 300 transmits the user's new certificate transmitted from the second certification authority 600 to the first terminal 400 (6).

The user receives the new certificate of the second certification authority 600 from the first terminal 400 and stores the new certificate in the smart card 100 (7).

By the above-described method, the new certificate usable in the external domain 500 is issued to the smart card 100.

Meanwhile, according to this embodiment of present invention, a user carries out safe electronic commerce with an external domain by verifying whether the terminal of the external domain is a terminal that has been certified from a corresponding certification authority as in the same manner as described in conjunction with the first embodiment. Accordingly, in the certification processes, when the second certification authority 600 creates the new certificate signed electronically by the second certification authority 600 and transmits the new certificate to the first certification authority 300, a public key of the second certification authority 600 is also transmitted. The public key transmitted to the first certification authority 300 is also transmitted to the smart card 100 when the new certificate is transmitted to the smart card 100 through the first terminal 400. The smart card 100 can verify the certificate of the second terminal 700 or a certificate signed electronically by the second certification authority 600 in the external domain 500 using the public key. By the processes described above, the certification processes of the user's smart card 100 can be performed in the second terminal 700 belonging to the external domain 500 through the newly issued certificate using the methods according to the first and second embodiments. That is, the user's smart card 100 requests certification through an access to the second terminal 700 of the external domain 500. The second terminal 700 verifies the new certificate of a user using a public key of the second certification authority 600 owned by the second terminal 700. If the new certificate is verified, a user's electronic signature is verified using the public key.

As described above, the method for registering and verifying the smart card certificate for users moving between the PKI domains has the following effects.

Users moving between the domains can store the certificate issued by the second certification authority of the external domain in their own smart cards using the certificate of the first certification authority, so that the users' smart cards can be verified using only the certificate of the first certification authority of the home domain.

Additionally, the user can previously store the certificate of the second certification authority of the external domain to be moved to, so that the certification processes according to the movement to the external domain can be simple.

Additionally, if the user obtains a public key that can verify the certificate issued by the second certification authority of the external domain, the second terminal of the external domain to be accessed by the smart card can be verified using the obtained public key of the second certification authority.

Although the above embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for registering and verifying a smart card certificate for users moving between public key infrastructure domains, comprising:
    a smart card for storing a first certificate of a first domain;
    a terminal located in a second domain to transmit a certification response using the first certificate of the smart card and to transmit a second certificate of the second domain to the smart card with respect to the transmitted certification response; and
    a second certification authority located in the second domain,
    wherein the second certification authority transmits its own public key to the terminal, and the terminal transmits the public key of the second certification authority to the smart card, and the smart card verifies the terminal by verifying the second certificate by using the public key of the second certification authority,
    wherein the first domain is different from the second domain, and
    wherein the second certification authority verifies the certification response transmitted through the terminal, creates the second certificate to be stored in the smart card and transmits the created second certificate to the terminal.

2. The system as set forth in claim 1, further comprising
    a first certification authority located in the first domain and connected to the second certification authority through a network to verify the certification response transmitted from the second certification authority through the network and to transmit a verification result to the second certification authority;

wherein the verification of the certification response from the second certification authority is performed depending upon the verification result of the first certification authority.

3. The system as set forth in claim 1, wherein the transmitted second certificate is stored in the smart card.

4. The system as set forth in claim 1, wherein a private key for the stored certificate is stored in the smart card.

5. The system as set forth in claim 1, wherein a public key for the stored certificate is stored in the smart card.

6. The system as set forth in claim 1, wherein the first domain includes a first certification authority which issues the first certificate, and the second domain includes a second certification authority which issues the second certificate.

7. A system for registering and verifying a smart card certificate for users moving between public key infrastructure domains, comprising:
   a smart card for storing a first certificate of a first domain;
   a first terminal located in the first domain to transmit a certification response using the first certificate stored in the smart card and to transmit a second certificate of a second domain to the smart card with respect to the transmitted certification response; and
   a second certification authority located in the second domain,
   wherein the second certification authority transmits its own public key to a first certification authority in the first domain, and the first certification authority transmits the public key of the second certification authority to the first terminal, and the first terminal transmits the public key of the second certification authority to the smart card, and the smart card verifies a second terminal in the second domain by verifying the second certificate by using the transmitted public key of the second certification authority,
   a first certification authority located in the first domain to verify the certification response transmitted through the first terminal and to transmit the second certificate to be stored in the smart card to the first terminal,
   wherein the first domain is different from the second domain.

8. The system as set forth in claim 7, wherein the second certification authority connected to the first certification authority through a network creates the second certificate and transmits the second certificate to the first certification authority in response to a certification request of the first certification authority.

9. A method for registering and verifying a smart card certificate for users moving between public key infrastructure domains, comprising the steps of:
   a user accessing a terminal located in a second domain using a smart card in which a first certificate of a first certification authority is stored;
   the smart card transmitting a certification response to a certification request of the terminal using the first certificate of the smart card to the terminal;
   the terminal transmitting the certification response of the smart card to a second certification authority located in the second domain; and
   the terminal transmitting a second certificate of the second certification authority transmitted from the second certification authority to the smart card in response to the transmitted certification response,
   wherein, the step of the terminal transmitting the second certificate of the second certification authority comprises the steps of:

the second certification authority transmitting its own public key to the terminal;
the terminal transmitting the public key of the second certification authority to the smart card; and
the smart card verifying the terminal by verifying the second certificate by using the public key of the second certification authority,
wherein the first domain is different from the second domain,
wherein the step of the smart card transmitting the certification response comprises the steps of:
the terminal transmitting a certification request message to the smart card; and
the smart card electronically signing the certification request message, and transmitting the certification response including the signed certification request message and the first certificate to the terminal.

10. The method as set forth in claim 9, wherein the step of the terminal transmitting the second certificate of the second certification authority comprises the steps of:
   the second certification authority verifying the transmitted certification response;
   the second certification authority creating the second certificate to be stored in the certified smart card, and transmitting the created second certificate to the terminal; and
   the terminal transmitting the transmitted second certificate to the smart card.

11. The method as set forth in claim 10, wherein the step of the second certification authority verifying the transmitted certification response comprises the steps of:
   the second certification authority transmitting the certification response transmitted from the smart card to the first certification authority located in the first domain and connected to the second certification authority through a network; and
   the first certification authority verifying the certification response and transmitting a verification result to the second certification authority.

12. The method as set forth in claim 9, wherein the transmitted second certificate is stored in the smart card.

13. The method as set forth in claim 9, wherein a private key for the stored certificate is stored in the smart card.

14. A method for registering and verifying a smart card certificate for users moving between public key infrastructure domains, comprising the steps of:
   a user accessing a first terminal located in a first domain using a smart card in which a first certificate of the first domain is stored;
   the smart card transmitting a certification response to a certification request of the first terminal using the first certificate of the smart card to the first terminal;
   the first terminal transmitting the certification response of the smart card to the first certification authority located in the first domain;
   the first terminal transmitting a second certificate of a second certification authority transmitted from the first certification authority to the smart card in response to the transmitted certification response,
   the second certification authority transmitting its own public key to the first certification authority;
   the first certification authority transmitting the public key of the second certification authority to the first terminal;
   the first terminal transmitting the public key of the second certification authority to the smart card; and
   the smart card verifying a second terminal by verifying the second certificate by using the transmitted public key of the second certification authority, wherein the first domain is different from a second domain, wherein the step of the smart card transmitting the certification response comprises the steps of:
the first terminal transmitting a certification request message to the smart card; and
the smart card electronically signing an electronic signature to the certification request message, and transmitting the certification response including the signed certification request message and the first certificate to the first terminal.

15. The method as set forth in claim 14, wherein the step of the first terminal transmitting the second certificate of the second domain comprises the steps of:
the first certification authority verifying the transmitted certification response;
the first certification authority requesting a second certificate to be stored in the verified smart card from a second certification authority located in the second domain;
the second certification authority creating the second certificate and transmitting the created second certificate to the first certification authority;
the first certification authority transmitting the transmitted second certificate to the first terminal; and
the first terminal transmitting the transmitted second certificate to the smart card.

16. The method as set forth in claim 14, further comprising the steps of:
the smart card storing the transmitted second certificate;
the smart card accessing a second terminal of the second domain;
the second terminal transmitting a certification request message to the smart card;
the smart card electronically signing the certification request message and transmitting a certification response including the signed certification request message and the stored second certificate to the second terminal; and
the second terminal verifying the certification response using a public key of the second certification authority.

17. The method as set forth in claim 14, wherein the transmitted second certificate is stored in the smart card.

18. The method as set forth in claim 14, wherein a private key for the stored certificate is stored in the smart card.

* * * * *